May 3, 1949. R. E. LAWS 2,469,046

BITLESS BRIDLE

Filed Oct. 15, 1946

Inventor

ROBERT E. LAWS

By *Clarence A. O'Brien and Harvey B. Jacobson*

Attorneys

Patented May 3, 1949

2,469,046

UNITED STATES PATENT OFFICE 2,469,046

BITLESS BRIDLE

Robert E. Laws, Kanab, Utah; Orpha M. Laws, administratrix of said Robert E. Laws, deceased, assignor to said Orpha M. Laws, Kanab, Utah Application October 15, 1946, Serial No. 703,316

5 Claims. (Cl. 54—6)

This invention relates to improvements in bitless bridles.

An object of the invention is to provide a bitless bridle for horses.

Another object of the invention is to provide an improved bitless bridle for horses including a pair of oppositely disposed rein supporting arms adapted to be positioned on either side of a horse's mouth, the same having rings formed in their opposite ends, the forwardly extending rings to support the bridle reins, while the rear rings are connected together by means of a transversely extending chin strap, each of said arms pivotally supporting a triangular shaped plate having an eye formed therein to secure the forward end of a bridle harness strap extending rearwardly along the horse's head to a common juncture of the customary cross straps positioned in front and behind the horse's ears and under its neck, the third corners of said plates supporting U-shaped guide clips through which arms pivoted to the rein supporting arms extend, being formed with eyes on their upper ends which are connected by hooks on the ends of an arcuate metal cross bar extending over the top of the horse's mouth, whereby the horse may be guided by pulling on the selected rein.

Another object of the invention is to provide an improved bitless bridle for horses which will be highly efficient in operation, and relatively inexpensive to manufacture and produce.

Other objects will appear as the description proceeds.

In the accompanying drawings which form a part of this application,

Like characters of reference are used throughout the following specification and the accompanying drawings to designate corresponding parts.

Figure 1:
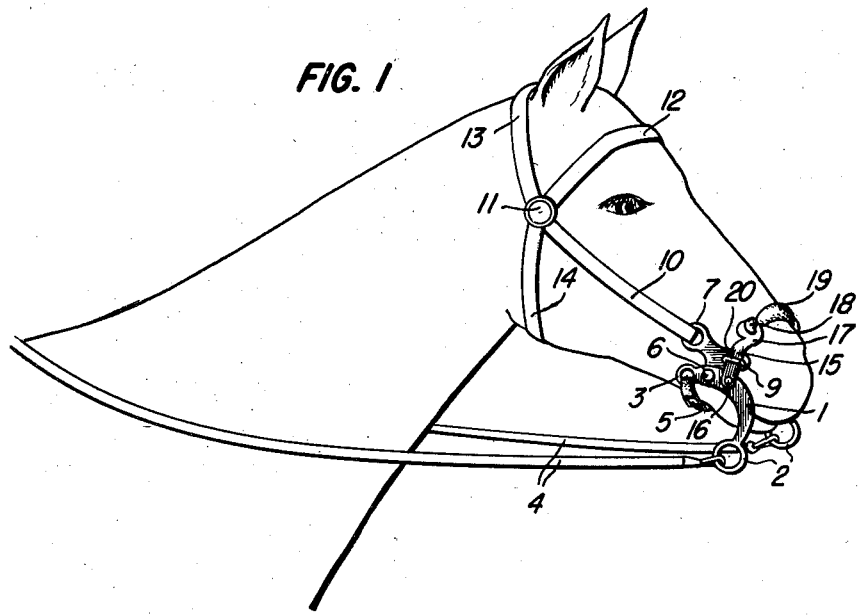
Figure 1 is a perspective view of the improved bitless harness in position upon a horse's head.
Figure 2:
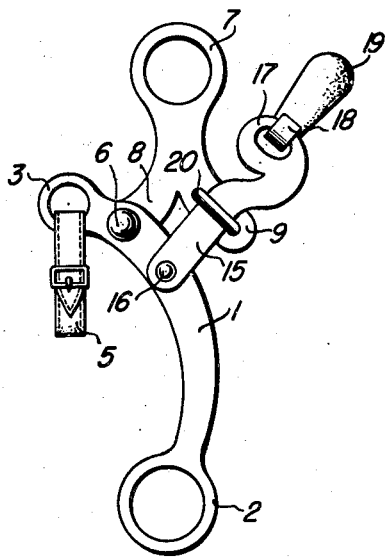
Figure 2 is a side elevation of one bitless bridle assembly.
Figure 3:
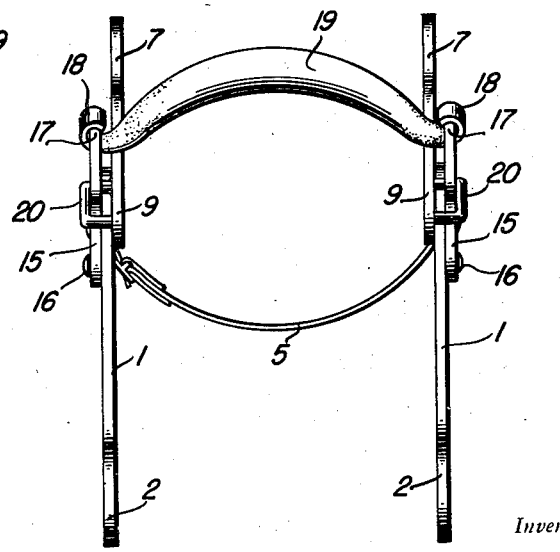
Figure 3 is a front elevation of the bitless bridle.

In carrying out the invention, there is provided an improved bitless harness for horses including similarly formed side harness assemblies, each comprising an arcuate rein supporting arm 1 having rings 2 and 3 formed at its front and back end, said front ring 2 supporting the forward end of the reins 4, while the rear ring 3 of each assembly is connected by the cross chin strap 5 disposed under the horse's chin.

Each of the side rein supporting arms 1 pivotally supports at 6, a substantially triangularly shaped harness plate including an eye 7 and two spaced arms 8 and 9, said arm 8 being pivoted at 6 to the arm 1.

The eye 7 supports the forward end of the harness strap 10 which extends rearwardly along the side of the horse's head to connect with a common juncture point 11 with the spaced cross straps 12 and 13 disposed in front of and behind the horse's ears, and the strap 14 extending under the horse's jaw.

The arm 9 on each plate supports a U-shaped guide clip 20, through which the arm 15 extends, the same being pivoted at 16 on the arm 1, and formed at its upper end with an eye 17 adapted to be engaged by the hook end 18 on the adjacent end of the arcuate metal nose bar 19 extending transversely above the horse's mouth.

From the foregoing description, it will be apparent that when the improved bitless harness is in operative position upon a horse, a pull on either rein 4 will guide and control the movements of the horse.

While the preferred embodiment of the instant invention has been illustrated and described, it will be understood that it is not intended to limit the construction thereto, as many minor changes in detail of construction may be resorted to without departure from the spirit of the invention.

Having thus described my invention what I claim as new and desire to secure by Letters Patent of the United States is:

1. A bitless harness for guiding and controlling horses comprising oppositely disposed inverted Y-shape side plates having eyes formed on the upper ends thereof, an arcuate rein supporting arm having an eye formed in each end thereof pivotally supported upon the rear arm of each of said inverted Y-shape side plates, guide means on the forward arm of each of said inverted Y-shape side plates, a nose bar supporting arm pivotally supported on each of said arcuate rein supporting arms extending through said guide means, a nose bar connected between the outer ends of said nose bar supporting arms, a chin strap connected between the upper ends of said arcuate rein supporting arms, head straps attached to the eyes on the upper ends of said side plates, and reins attached to the eyes in the lower ends of said arcuate rein supporting arms.

2. A bitless harness for guiding and controlling horses comprising oppositely disposed inverted Y-shape side plates having eyes formed on the upper ends thereof, an arcuate rein supporting arm having an eye formed in each end thereof pivotally supported adjacent its upper end upon the rear end of said inverted Y-shape side plates, U-shape guide means on the forward arm of each of said inverted Y-shape side plates, a nose bar supporting arm pivotally supported at its lower end on each of said arcuate rein supporting arms forwardly of the pivotal connection between each rein supporting arm and the rear side arm of each plate, a nose bar connected between the outer ends of said nose bar supporting arms, a chin strap connected between the upper ends of said arcuate rein supporting arms, head straps attached to the eyes on the upper ends of said side plates, and reins attached to the eyes in the lower ends of said arcuate rein supporting arms.

3. A bitless harness for guiding and controlling horses comprising oppositely disposed side arms having eyes on their opposite ends, reins secured to the forward eyes, chin straps connected to the rear eyes, plates pivoted to said arms and including eye portions, head straps secured to said eye portions, U-shaped guide means on said plates, nose bar supporting arms extending through said guide means and pivoted to said side arms and a nose bar connecting said supporting arms.

4. A bitless harness for guiding and controlling horses comprising oppositely disposed side arms having eyes on their opposite ends, reins secured to the forward eyes, chin straps connected to the rear eyes, oppositely disposed inverted Y-shape side plates pivoted to said arms and including eye portions, head straps secured to said eye portions, U-shaped guide means on said Y-shaped plates, nose bar supporting arms, eyes at one end of said supporting arms, said arms being pivoted at the other end to said side arms and a nose bar connecting said supporting arms.

5. The combination of claim 4 wherein said Y-shaped side plates include a pair of depending arms, one of said arms being pivoted to said side arms, the other of said arms mounting the U-shaped guide means.

ROBERT E. LAWS.

REFERENCES CITED

The following references are of record in the file of this patent:

UNITED STATES PATENTS

| Number | Name | Date |
| --- | --- | --- |
| 1,315,357 | Aas | Sept. 9, 1919 |
| 2,342,449 | Burgess | Feb. 22, 1944 |
| 2,347,752 | Schmelz | May 2, 1944 |

FOREIGN PATENTS

| Number | Country | Date |
| --- | --- | --- |
| 33,606 | Norway | Nov. 21, 1921 |
| 215,955 | Germany | Nov. 4, 1909 |
| 458,930 | Great Britain | Dec. 30, 1936 |